United States Patent [19]

Nam

[11] Patent Number: 5,347,448
[45] Date of Patent: Sep. 13, 1994

[54] MULTIPROCESSOR SYSTEM FOR HYDRAULIC EXCAVATOR

[75] Inventor: Sang-Yop Nam, Seoul, Rep. of Korea

[73] Assignee: Samsung Heavy Industries Co., Ltd., Changwon, Rep. of Korea

[21] Appl. No.: 981,211

[22] Filed: Nov. 25, 1992

[51] Int. Cl.⁵ ............................................ G06F 15/20
[52] U.S. Cl. ............................. 364/167.01; 37/414; 364/424.07; 414/699
[58] Field of Search ................. 364/167.01, 424.01, 364/424.07, 559, 561; 37/414, 348, 396; 414/698-700; 172/4.5; 340/685, 686, 684

[56] References Cited

U.S. PATENT DOCUMENTS

| | | | |
|---|---|---|---|
| 3,934,126 | 1/1976 | Zalesov et al. | 364/424.07 |
| 4,035,621 | 7/1977 | Kemp | 364/424.07 X |
| 4,377,043 | 3/1983 | Inui et al. | 364/424.07 X |
| 4,491,927 | 1/1985 | Bachmann et al. | 364/561 |
| 4,688,468 | 8/1987 | Axinti et al. | 91/317 |
| 4,866,641 | 9/1989 | Nielsen et al. | 364/424.07 X |
| 5,065,326 | 11/1991 | Sahm | 364/424.07 |
| 5,088,020 | 2/1992 | Nishida et al. | 364/424.07 X |

Primary Examiner—Joseph Ruggiero
Attorney, Agent, or Firm—Antonelli, Terry, Stout & Kraus

[57] ABSTRACT

A multiprocessor system for an excavator is disclosed. The multiprocessor system has a joy stick which controls each of cylinders for a bucket, a dipper, a boom, a swing and/or traveling parts of the excavator and adjusts engine, pump and hydraulic valves by using microprocessors. As a result, performance and function of the excavator are improved.

1 Claim, 3 Drawing Sheets

MULTIPROCESSOR SYSTEM FOR HYDRAULIC EXCAVATOR

BACKGROUND OF THE INVENTION

1. Field of the Invention

The present invention relates to a multiprocessor system for a hydraulic excavator, more particularly, to a multiprocessor system which controls each of cylinders for a bucket, a dipper, a boom, swing and traveling parts in the excavator and adjust an engine and pump and hydraulic valves, improving system performance considerably.

2. Description of the Prior Art

FIG. 1 shows a block diagram of a conventional excavator control system. Such an excavator control system shown in FIG. 1 has a construction which allows multiple mechanical elements to be controlled by means of electronics. In many cases, such a conventional excavator control system has a control means which is composed of an one-chip controller or 16-bit processor.

In conventional excavators, however, there is so-called "engine stall" resulting from an overload momentarily produced in executing a given work or duty. Further, an engine output power reducement caused due to a change of working environment, for example, an uphill movement or the like or engine change, a full power curve is generally scheduled to a relatively lower level than a rated output power of the engine.

In any instance, an engine throttle level of the excavator must be completely pulled to execute a given duty or job. As a result, fuel consumption as well as noises will be substantially caused regardless of the kinds of duty, that is, a standard duty, for example, public construction works and general excavating works, and a heavy duty, for example, rock crushing works.

In many cases, the excavator must wait for a predetermined period of time, that is, a waiting time required for the movement of a dump truck. In this case, the engine changes from a normal operating mode to a waiting mode (i.e., a negative load state). Accordingly, the amount of the fuel required to retain an idling state of the engine and hydraulic standby load is substantially consumed to the same degree as with the case of the rated load. As a result, loss in energy is increased considerably.

SUMMARY OF THE INVENTION

Accordingly, an object of the present invention is to provide a multiprocessor system for a hydraulic excavator, which executes an optimum engine and pump control, automatic operating control,, operation capability optimizing control, system security control, self-testing and trouble predicting control to improve a performance of the hydraulic excavator.

To achieve the object, the present invention contemplates a multiprocessor system for a hydraulic excavator which includes a main CPU module for executing an operation function of excavator control data so as to assure proper management and security of an engine, an input control means connected to the main CPU module through a main bus for processing external input signals, an engine and pump control means connected to the main CPU module through the main bus for receiving data supplied from external sensors and controlling the engine and pump and a boom position control means for positioning a boom in place and executing an operation. Also, the system further includes a dipper position control means for executing a dipper positioning control and for executing an operation, a bucket position control means for executing a bucket positioning control and for executing an operation, a swing position control means for controlling function and position of a swing part, and a travel position control means for controlling a function and a speed of a travelling part.

The above and other abjects, features and advantages will be apparent from the following description taken with reference to the accompanying drawings.

DETAILED DESCRIPTION OF THE INVENTION

Now, the present invention will be described in detail.

Figure 1:
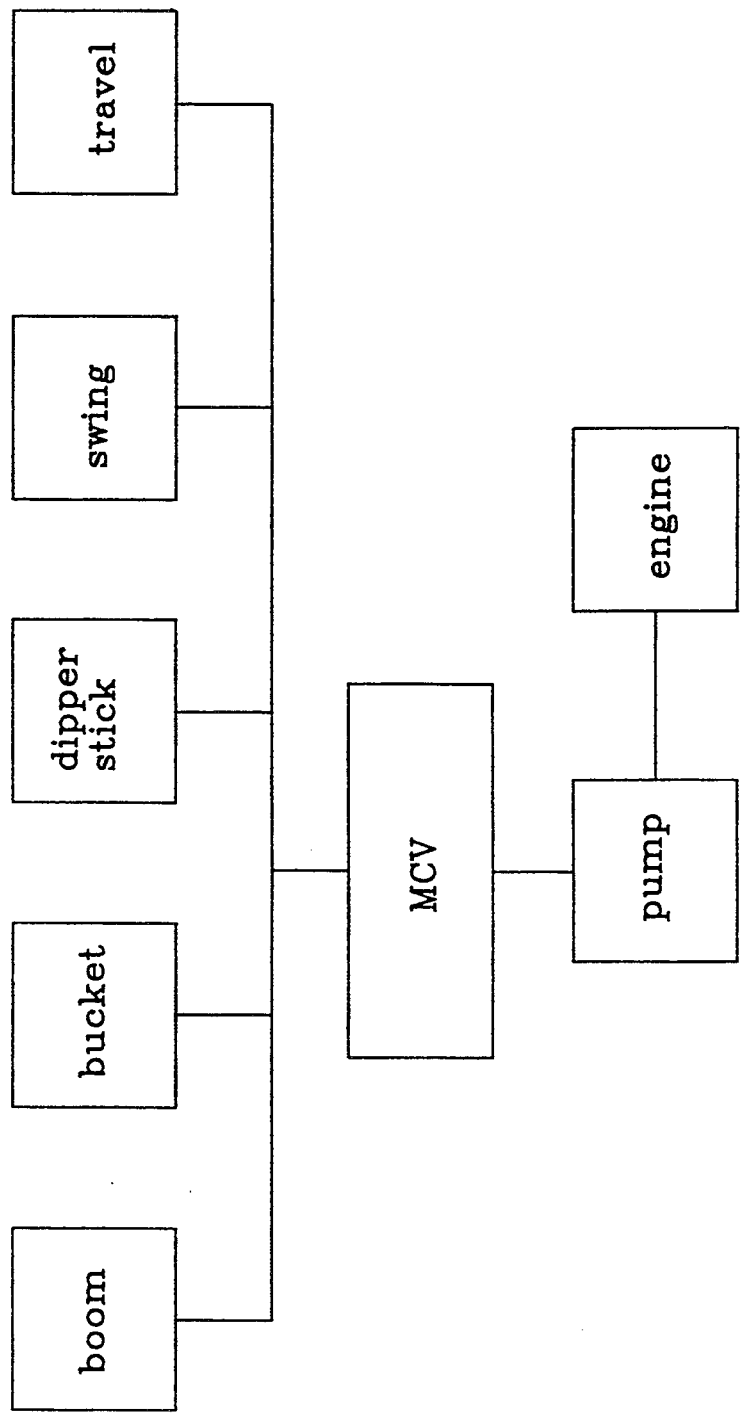
FIG. 1 is a schematic block diagram of a conventional excavator control system.
Figure 2:
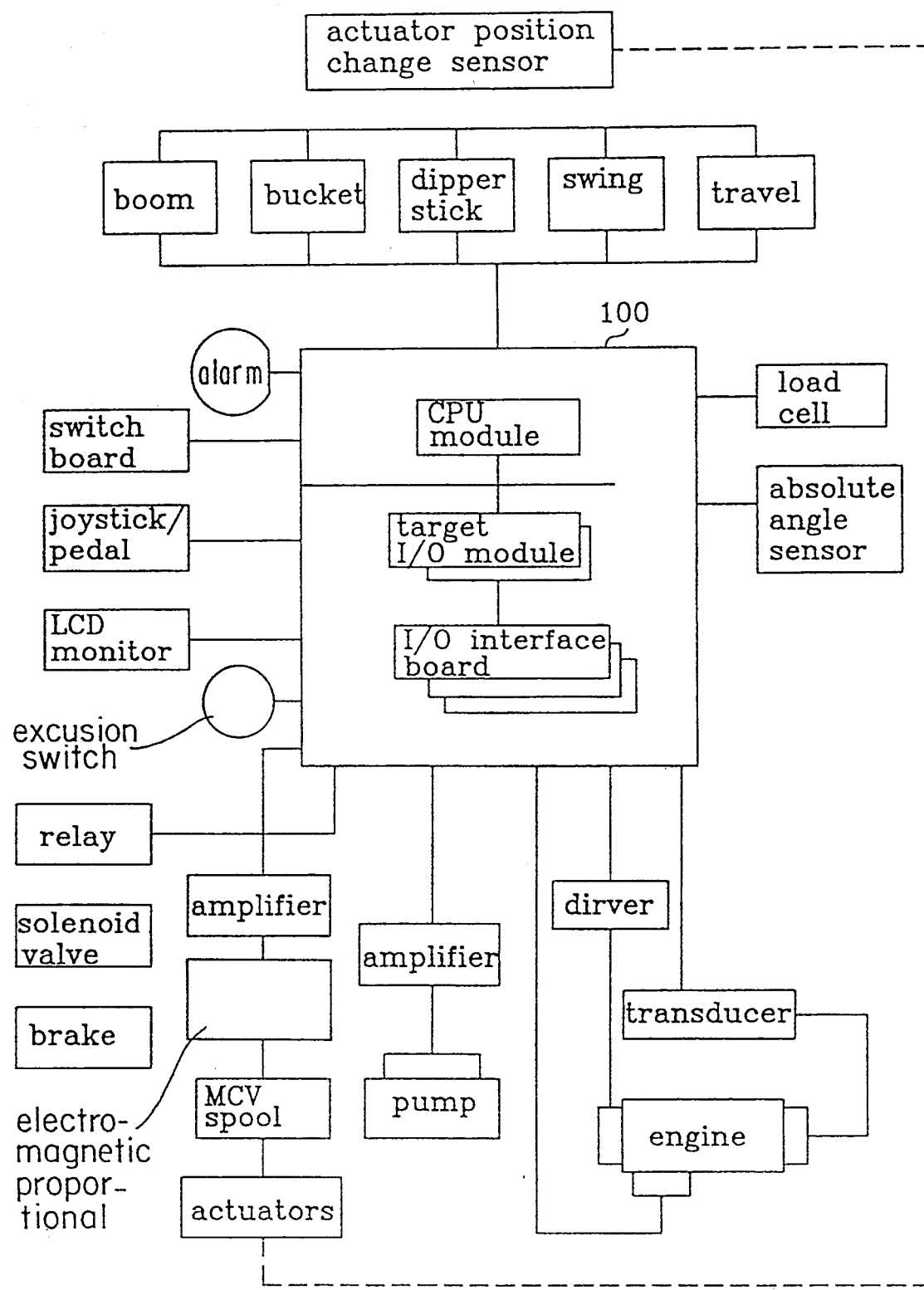
FIG. 2 is a block diagram of a hydraulic an excavator system in which the present invention is employed; and, FIG. 3 is a block diagram of a multiprocessor system for a hydraulic excavator according to the present invention.

FIG. 2 is a block diagram of an entire excavator control system according to the present invention. In the drawing, reference numeral 100 denotes a multiprocessor system embodying the present invention. This multiprocessor system has an internal construction shown in FIG. 3. More specifically, in FIG. 3 a main CPU module, generally denoted at 10, executes a given operation function of excavator control data so as to assure management and safety of the engine. That is, the main CPU module executes functions such as automatic carry position return, automatic actuator preoperating control, teaching and play back, automatic anti-tipping control, automatic anti-overturn control to a travel and/or the like.

Figure 3:
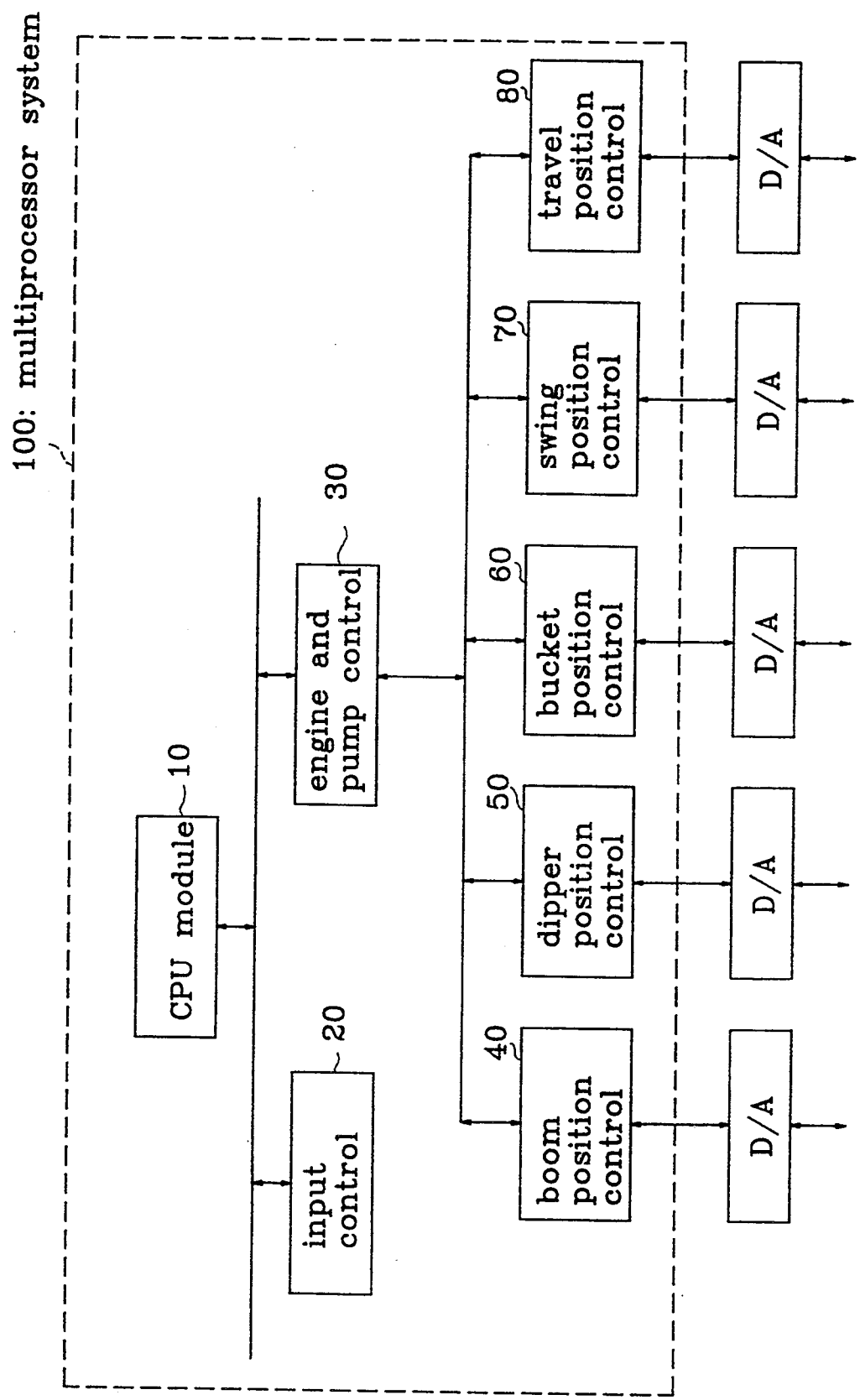

An input control portion, generally denoted at 20, processes external input signals, for example, externally programmed operation, teaching and playback, automatic dumping control, automatic anti-overload control and/ or the like. In FIG. 3, an engine and pump control portion 30 receives data supplied from external sensors (not shown) and controls the engine and pump. More specifically, the engine and pump control portion 30 functions to increase an initial power of the engine pump in a range above the rated power of the engine. The engine and pump control portion 30 senses the engine speed and monitors the load acted on the engine at every moment so as to produce a control signal which, in turn, is applied to the main CPU module 10. The engine and pump control portion 30 also changes negative control instruction pressure that is exerted to the pump via a proportional electromagnetic pressure reducing valve (not shown) without variation of steps to allow the rated output power of the engine to be advantageously used.

In addition, the engine and pump control portion 30 functions to control the engine and pump so that desired pressure and flow rate are changed according to the kind of given duty to prevent fuel from being lost in a light duty.

In other words, with the conventional excavator, a working speed is controlled by way of throttle pressure reducement achieved by manipulating a lever under a light duty. But, according to the present invention, the output power of the engine and pump can be set in three modes, for example, "H(heavy)", "S(standard)" and "L(light)" in accordance with the kinds of given duty in such a way that the modes can be effectively selected depending upon the working condition.

According to the present invention, even if the excavator is in a waiting state during the momentary stop of working, the engine throttle position is moved to an idle state to control the speed of the engine. As a result, the amount of the fuel consumed can be advantageously reduced.

At this time, as a volume switch is adjusted to control the engine throttle, an electric signal is generated in proportion to a manipulated variable of a joy stick to directly control the flow rate discharged from the pump.

Upon the signal produced by manipulating the joy stick or pedal, or both the joy stick and pedal, the flow rate discharged from the pump is adjusted and a multi-control valve is also controlled so that the manipulation ability of the system is improved and of flow rate loss is prevented effectively. Furthermore, when the excavator performs duties, the desired speed set by the joy stick and pedal is compared with the actual speed to check the flow rate supplied from the pump with respect to the desired flow rate. If the flow rate is insufficient, a spool stroke of another actuator on which no any load is applied is reduced to decelerate in speed while the operating actuator is increased in speed to constantly maintain the actual speed to the desired speed. As a result, the speed can be constantly assured regardless of the load pressure acting on the respective actuators.

Referring to FIG. 3, a boom position control portion 40, a dipper position control portion 50 and a bucket position control portion 60 excavator execute the operational function related to the control of the boom, dipper and bucket of the excavator and are connected by data communications to the engine pump 30.

A swing position control portion 70 and travel position control portion 80 serve to control the operation and position of the swing and travel, respectively.

When land readjustment is made by the excavator with respect to an absolute plane and only a joy stick for a dipper stick is moved, the boom and bucket are driven automatically by the boom position control portion 40 and bucket position control portion 60 to thereby achieve the desired land readjustment.

The swing position control portion 70 and travel position control portion 80 control swing and travel operations in such a way that the excavator can be stopped at the working position even if the swing operation, and an angle of the excavator body are changed. In braking the swing operation only a force needed to brake the swing is developed to thereby prevent swing reduction gear from being damaged due to an excessive braking force.

Further, according to the present invention, when troubles in the excavator occur, the operator is informed by an alarm and/or monitor by way of a self-testing and trouble predicting functions.

For repeated working at the same time and position, the present invention defines teaching the movement of the respective actuators and playing back the same movement by the joy stick and pedal so as to execute automatically the repeated working.

In addition, an automatic dumping can be achieved with the manipulation capability of the excavator. The flow rate discharged from the pump and and supplied to a swing motor is adjusted in accordance with the rotating speed independent of the manipulated variable of the joy stick to reduce the flow rate lost in the swing operation.

According to the present invention, the discharged flow rate of the pump and multi-control valve spool stroke are adjusted to suppress shock occurring at the start and/or stop of the actuators.

As described above, according to the present invention, energy efficiency and operation capability of the excavator can be improved as well as the manipulation performance and reliability can be also improved considerably by the multiprocessor system of the invention.

Although the present invention has been described with reference to the specified embodiment, it should be understood that various modifications and changes will be made therein without departing from the spirit and scope of the invention.

What is claimed is:

1. A multiprocessor system for a hydraulic excavator, comprising
   a main CPU module for executing an operation function of excavator control data so as to assure proper management and security of an engine;
   an input control means connected to the main CPU module through a main bus for processing external input signals;
   an engine and pump control means connected to the main CPU module through the main bus for receiving data supplied from external sensors and controlling the engine and pump;
   a boom position control means for positioning a boom in place and for controlling execution of an operation by a boom;
   a dipper position control means for executing a dipper positioning control and for controlling execution of an operation by a dipper;
   a bucket position control means for executing a bucket positioning control and for controlling execution of an operation by a bucket;
   a swing position control means for controlling operation and positioning of a swing part; and
   a travel position control means for controlling operation of a travel part.

* * * * *